Jan. 1, 1929.
I. W. NONNEMAN
DIE STOCK
Filed June 25, 1927
1,697,690
2 Sheets-Sheet 1
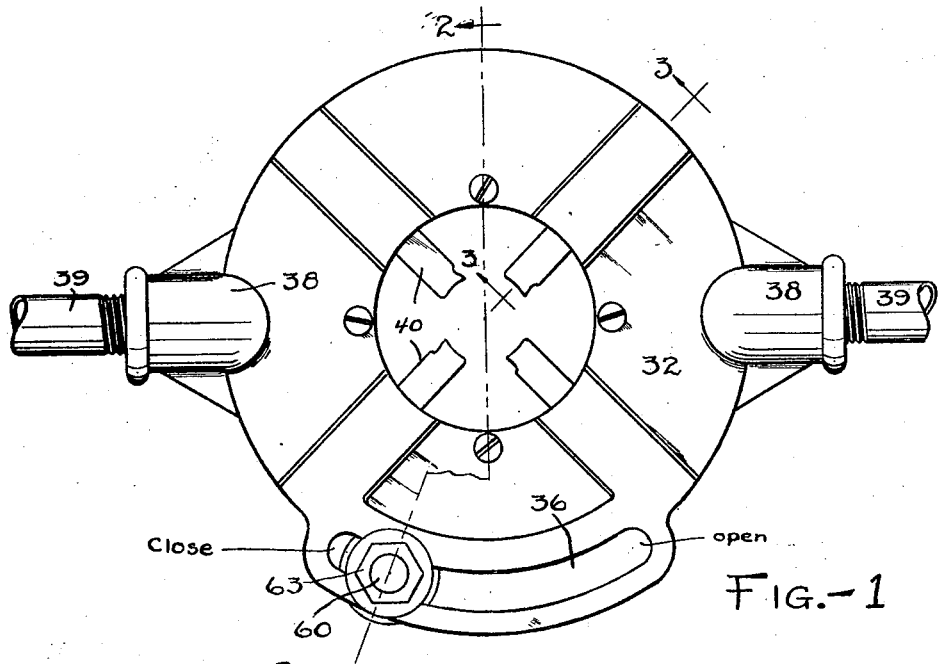
Fig.-1
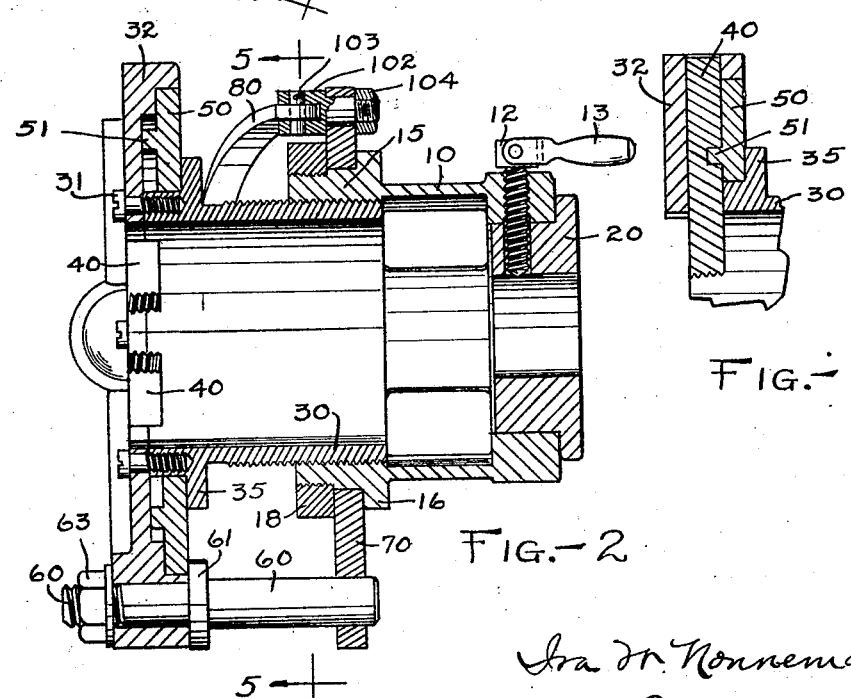
Fig.-2
Fig.-3
Inventor
Ira W. Nonneman,
Attorneys Jan. 1, 1929.  
I. W. NONNEMAN  
DIE STOCK  
Filed June 25, 1927

1,697,690

2 Sheets-Sheet 2

Inventor  
Ira W. Nonneman,  
By Bakis, Macklin, Golrick & Teag  
Attorneys

Patented Jan. 1, 1929.

1,697,690

UNITED STATES PATENT OFFICE.

IRA W. NONNEMAN, OF WARREN, OHIO, ASSIGNOR TO THE BORDEN COMPANY, OF WARREN, OHIO, A CORPORATION OF OHIO.

DIE STOCK.

Application filed June 25, 1927. Serial No. 201,489.

This invention relates to a die stock of the type adapted to cut tapered threads by the employment of chasers which recede during the threading operation. An object of the invention is to provide such a die stock in a form which will be very simple in construction, resulting in a tool which is comparatively light and cheaply manufactured, but at the same time efficient in service and durable. Another feature of my invention comprises a simple adjustment enabling the same die stock to serve for different sizes of pipe.

To the above ends, I provide a frame adapted to be clamped on the pipe to be threaded, a rotary frame having a threaded connection with the stationary frame, chasers carried by the rotary frame under the control of a cam plate (which may be primarily adjusted according to the size of pipe) and a link connecting the cam plate with the stationary frame in such manner that as the rotary frame is rotated, the cam plate is gradually shifted to cause the chasers to recede.

The invention will hereinafter be more fully described in connection with the accompanying drawings, and the essential novel features are summarized in the claims.

Figure 4:
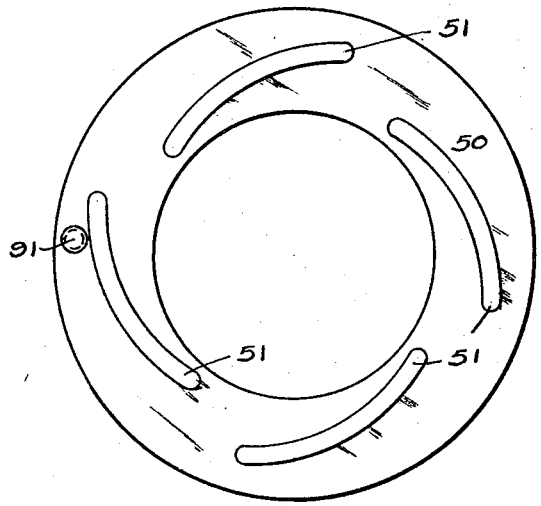
Figure 6:
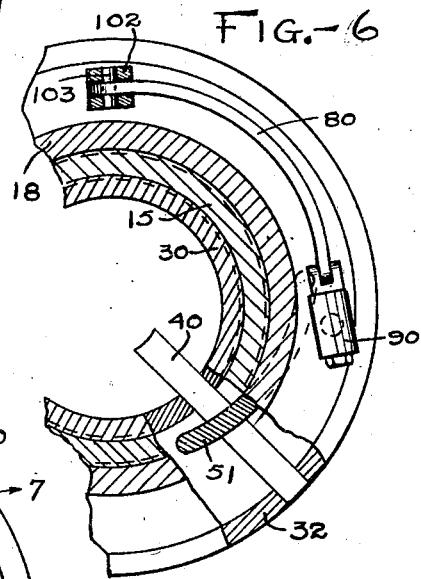
Figure 5:
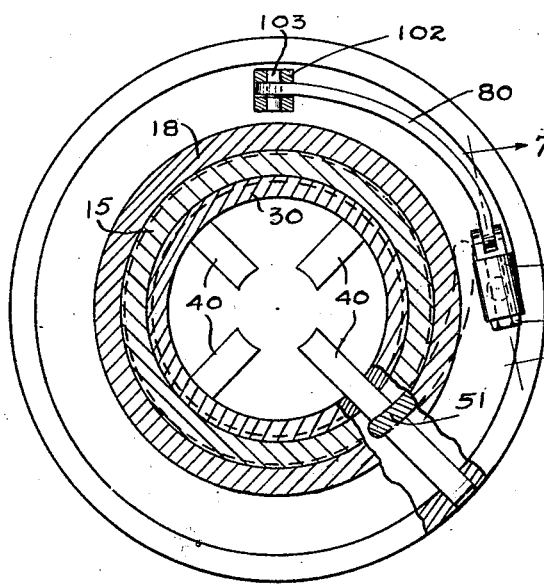
Figure 7:
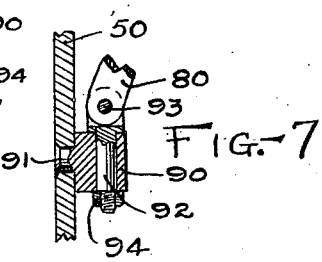

In the drawings, Fig. 1 is an end view of the die stock, with the removable handle broken away; Fig. 2 is a radial section of the die stock, as indicated by the offset line 2—2 on Fig. 1; Fig. 3 is a detail showing the engagement of the cam plate with a chaser, this view being a radial section on the line 3—3 on Fig. 1; Fig. 4 is a face view of the cam plate; Fig. 5 is a cross-section of the die stock on a plane indicated by the line 5—5 on Fig. 2, and looking toward the cam plate, this view showing the parts in the position they occupy at the beginning of the threading operation, and corresponding in position to Fig. 2; Fig. 6 is a view similar to Fig. 5 showing the position of the corresponding parts at the end of the threading operation; Fig. 7 is a detail showing the connection at one end of the link in cross-section, as indicated by the line 7—7 on Fig. 5.

As shown in the drawings, 10 indicates a suitable stationary frame adapted to surround the pipe and be clamped thereto. To adapt the frame for different size pipes, I prefer to insert one or more interchangeable bushings 20. A suitable clamping screw 12 having an operating handle 13 may be threaded in the frame 10 and pass loosely through the bushing (if one is employed) into engagement with the pipes. The intermediate body of the frame 10 may be open for lightness of construction as shown in Fig. 2. Near its forward end it has a continuous ring like head 15 which is internally threaded, while on the exterior is a flange 16. Opposed to this flange is a removable ring 18 threaded on the head 15 and abutting a shoulder thereon to leave a groove between them.

Engaging the internal threads of the stationary frame is an externally threaded rotatable cylindrical frame 30. To the end of this frame is rigidly secured, by screws 31, a head plate 32 which has radial housings for the chasers 40. The head plate is provided with diametrically opposed screw threaded sockets 38 to receive the threaded inner ends of the handle 39 in the usual manner. The rotatable frame has an external flange 35 leaving a groove between it and the head plate. In this groove is mounted the cam plate 50, the outer region of the cam plate resting in the rabbeted inner edge of the head plate 32. The cam plate has scroll like ribs 51 which occupy transverse grooves in the chasers 40, so that rotative movement of the cam plate with reference to the rotary frame changes the radial position of the chasers.

The head plate 32 is formed with an arcuate slot 36, and adjustably clamped in this slot is a pin 60 extending parallel with the axis of the die stock. As shown, the pin has a shoulder 61 engaging the inner face of the head plate and is threaded on its outer portion to receive a nut 63 clamping against the outer face of the head plate. Rotatably mounted in the external groove of the stationary frame is a ring 70 provided with an ear which has a round hole through which the pin 60 slidably extends. The result is that as the rotary frame is rotated the ring 70 must be rotated with it though the pin 60 slides through this ring as the rotary frame travels by reason of its threaded engagement with the stationary frame.

80, in Figs. 2, 5, 6 and 7, indicates a link pivotally anchored at one end to the cam plate and at the other to the rotary ring 70. This link, when the die stock is in its initial position, as shown in Fig. 2, extends in an inclined direction from the ring 70 to the cam plate. Now as the rotary frame in rotating enters the stationary frame, this link is thereby swung so that the end connected to the cam plate gradually approaches the end of the stationary frame, and this approach shoves around the cam plate. The scroll ribs are in such direction that this shoving withdraws the chasers. Accordingly, while the ring 70, the chaser head, the cam plate and link 80 all revolve about the axis of the pipe, nevertheless there is a shifting of the cam plate during such revolution by reason of the swinging of the link.

The parts are so proportioned that the withdrawal of the chasers, affected by the swinging link, as described, is at the proper rate to give the desired tapered thread. It is to be understood that the pitch of the internal and external threads on the stationary and rotary frames correspond to the pitch of the chasers, whereby a proper lead is effected.

The link 80 extends for about a quadrant around the die stock, and is out of the way behind the head 32. The ends of the link are universally, or at least pivotally, connected to the cam plate and the rotary ring respectively. While the form of pivotal anchorage may be varied from that shown, I have shown a block 90 swiveled to the cam plate 50 by reason of an extension 91 having an upset head, and in this block is swiveled a clevis 92 to which one end of the link is pivoted, by a pivot pin 93, a suitable nut 94 on the shank of the clevis holding it in place. This construction is shown particularly in Fig. 7. Somewhat similarly, the other end of the link 80 is shown in Fig. 2 as secured by a pivot pin 103 to a clevis 102, the shank of which is swiveled in the ring 70, a suitable nut 104 on the shank holding the clevis in the ring.

It will be seen that the construction comprises comparatively few parts, and that the same pin 60 which connects the head plate with the rotary ring 70 provides the means for initially adjusting the chaser for different sizes of pipe by reason of the pin being mounted in a slot 36. Thus, as illustrated in Figs. 1 and 2, the pin may be adjacent one end of the slot and the bushing 20 of smallest bore employed for the smallest size of pipe. The pin would be in an intermediate portion of the slot for an intermediate size of pipe and a bushing of larger bore employed. For the larger size the pin would be adjacent the other extreme end of the slot, and the bushing might be omitted.

With the proper bushing installed, and the pin 60 properly set, the die stock is ready for use when the rotary frame is screwed out to the position shown in Fig. 2. Then, when the stationary frame is clamped on the pipe, the rotation of the rotary frame by its handles 39 causes the chasers to thread the pipe and automatically recede to produce the desired tapered thread.

I claim:

1. In a die stock, the combination of a stationary frame adapted to be clamped to the work to be threaded, a rotary frame having a threaded connection with the stationary frame, chasers movably mounted in the rotary frame, a cam plate mounted on the rotary frame for controlling said chasers, a ring rotatable on the stationary frame, a link approximately concentric of the die stock connecting the ring with the cam plate, and means for causing the ring to rotate as the rotary frame rotates.

2. In a die stock, the combination of a stationary frame adapted to be clamped to the work, a rotary frame movable within the stationary frame, movable chasers carried by the rotary frame, a cam plate carried by the rotary frame controlling the chasers, such cam plate being movable on the rotary frame, a ring rotatable on the exterior of the stationary frame, a link pivotally connected at one end to the ring and at the other end to the cam plate, and a pin slidably connecting the rotary frame with the ring.

3. The combination of a stationary frame adapted to be clamped about a pipe to be threaded, a rotary frame having a sleeve extending within the stationary frame and threaded thereto, chasers carried by the rotary frame, a cam plate movable on the rotary frame for controlling the chasers, a ring journalled on the stationary frame, a link curving about said sleeve and having one end pivotally connected to the ring and the other end pivotally connected to the cam plate and a driving connection between the rotary frame and ring which is adjustable on one of them to vary the setting of the chasers for different sizes of pipe.

4. The combination of a stationary frame adapted to surround the pipe and be clamped thereto, a rotary frame extending within the stationary frame, said rotary frame having a head with housings for chasers, radially movable chasers mounted in said housings, a cam plate on the head controlling the chasers, a ring rotatably mounted on the stationary frame, a link pivotally connected at its ends respectively to the ring and cam plate, the head of the rotary frame having an arcuate slot, and a longitudinal pin adjustably clamped in said slot and extending slidably through a hole in said ring.

5. In a die stock the combination of a stationary frame, a rotatable frame having a laterally projecting head and a sleeve threaded into the stationary frame, chasers carried by said head, a cam plate for controlling the chasers, and a curved link pivotally connected at one end to the cam plate and at the other end to means rotatable on the stationary frame and intermediately lying about the sleeve portion of the rotary frame and behind the head portion of such frame.

6. In a die stock, the combination of a stationary frame a rotary frame movable longitudinally with reference to the stationary frame, chasers carried by the rotary frame, a cam plate for controlling the chasers, a link pivotally connected at one end by a substantially universal joint to the cam plate, and at the other end by a substantially universal joint to means rotatable on the stationary frame.

7. The combination of a stationary frame adapted to surround a pipe and be clamped thereto, a rotatable frame having a sleeve extending into the stationary frame, chasers mounted in the rotary frame, a cam plate controlling the chasers, a rotatable ring on the stationary frame driven by the rotary frame, anchorage members movably mounted on the cam plate and ring respectively, and a curved link pivoted at its opposite ends to said anchorage members respectively.

8. In a die stock, the combination of a stationary frame, a rotatable frame movable longitudinally with reference to the stationary frame, chasers carried by the rotary frame, a cam plate for controlling the chasers, a ring rotatable on the stationary frame and driven around by the rotary frame, a block swiveled to the cam plate and a block swiveled to the ring and a link pivoted at its opposite ends to said blocks respectively.

In testimony whereof, I hereunto affix my signature.

IRA W. NONNEMAN.